(12) United States Patent
Urano et al.

(10) Patent No.: US 7,664,758 B1
(45) Date of Patent: Feb. 16, 2010

(54) INTEGRATED DATABASE SYSTEM AND METHOD FOR ACCESSING A PLURALITY OF DATABASES

(75) Inventors: Akihiro Urano, Fujisawa (JP); Kenichi Yoshida, Kitamoto (JP); Shigeru Miyake, Tokyo (JP); Toshiaki Hirata, Kashiwa (JP); Masaaki Oya, Yokohama (JP); Atsushi Mitomi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/602,409

(22) Filed: Jun. 23, 2000

(30) Foreign Application Priority Data

Jun. 23, 1999 (JP) ................................. 11-176412

(51) Int. Cl.
*G06F 17/30* (2006.01)
(52) U.S. Cl. ...................... 707/100; 707/101; 707/102; 707/10
(58) Field of Classification Search ................ 707/100, 707/102, 1, 104.1; 345/733
See application file for complete search history.

(56) References Cited

U.S. PATENT DOCUMENTS 5,873,088 A * 2/1999 Hayashi et al. ............. 345/733
5,895,461 A * 4/1999 De La Huerga et al. ......... 707/1
5,907,837 A * 5/1999 Ferrel et al. ............... 707/104.1

FOREIGN PATENT DOCUMENTS

JP 04104342 4/1992

OTHER PUBLICATIONS

"LDAP: Programing Directory-Enabled Applications with Lightweight Directory Access Protocol".

* cited by examiner

*Primary Examiner*—Safet Metjahic
*Assistant Examiner*—Cam-Linh Nguyen
(74) *Attorney, Agent, or Firm*—Sofer & Haroun, LLP

(57) ABSTRACT

An integrated database system comprises a plurality of database systems connected to one another through a network, each of the plurality of database systems managing its own stored data independently of the other database systems and accessing the stored data in accordance with an access request, and an integrated database unit connected to the network. The integrated database unit includes a directory database which stores a correspondence between each of the data stored in the plurality of database systems and a database system in which each of the data is stored, a directory control unit which acquires, by using the directory database, directory information corresponding to target data of the accepted access request, a database identifying unit which identifies a database system, and a database control unit which issues, on the basis of the acquired directory information, an access request to the database system having the target data of the accepted access request. The database system includes a database server unit which accesses a database in accordance with the access request issued by the integrated database unit.

15 Claims, 6 Drawing Sheets

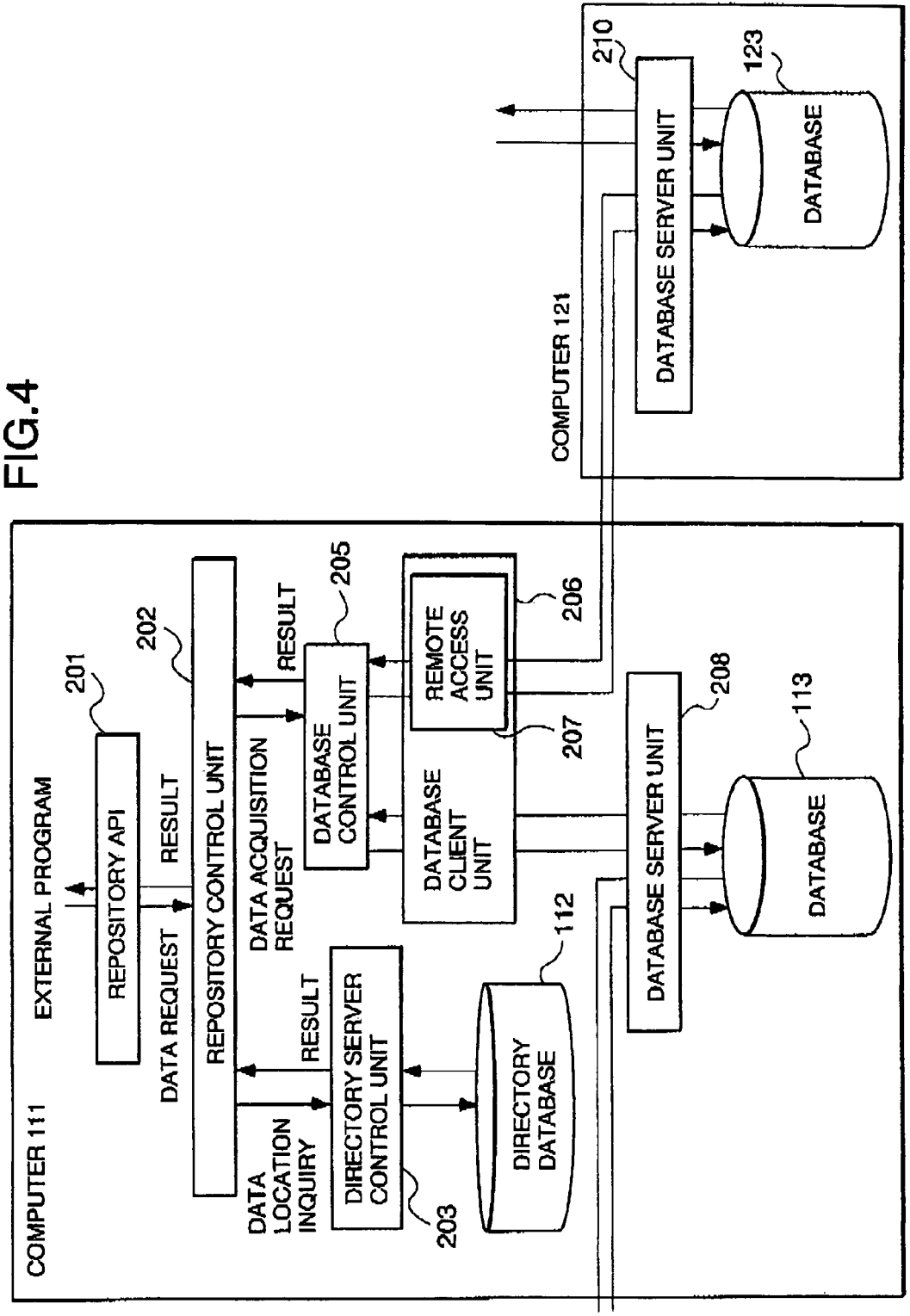

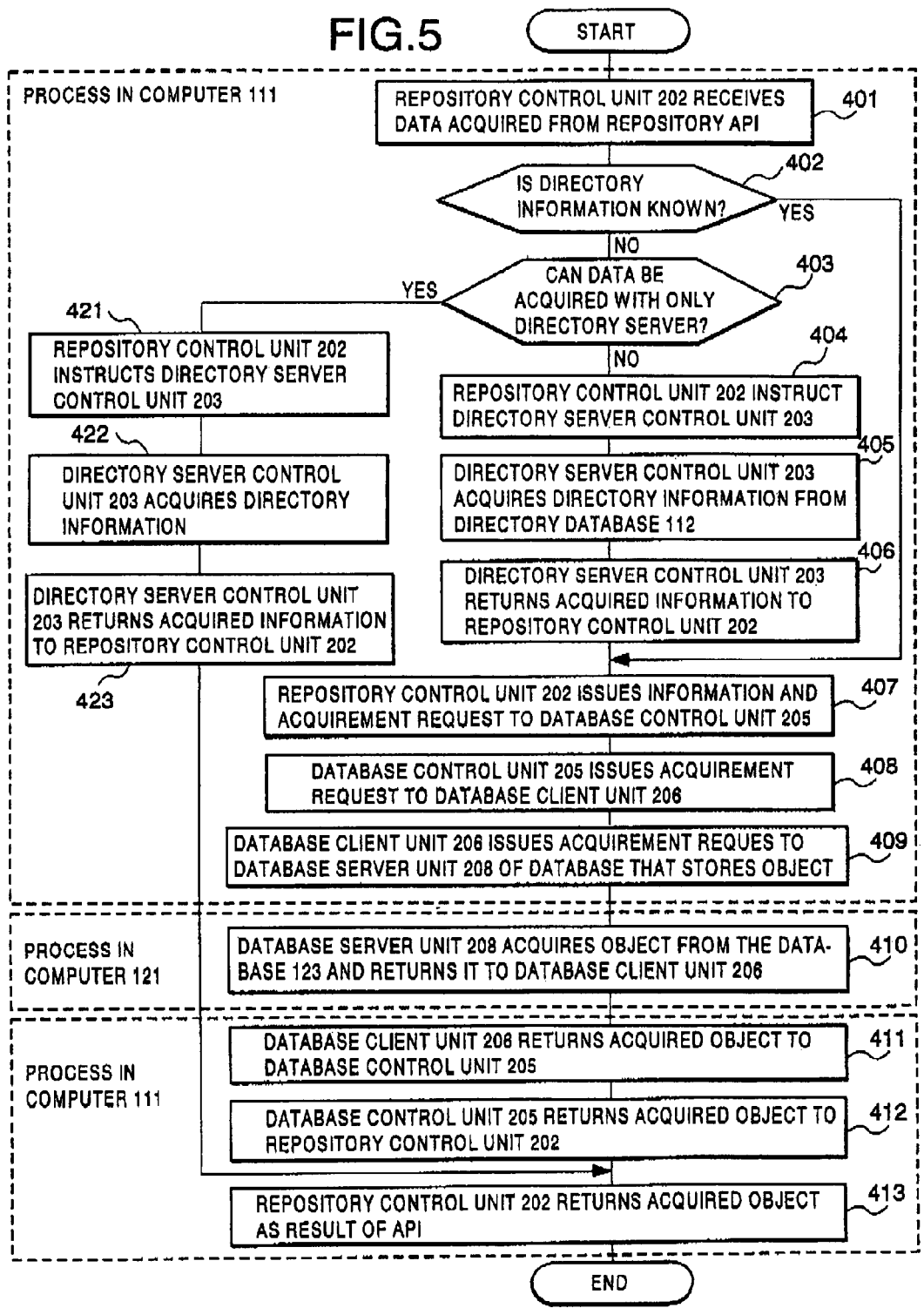

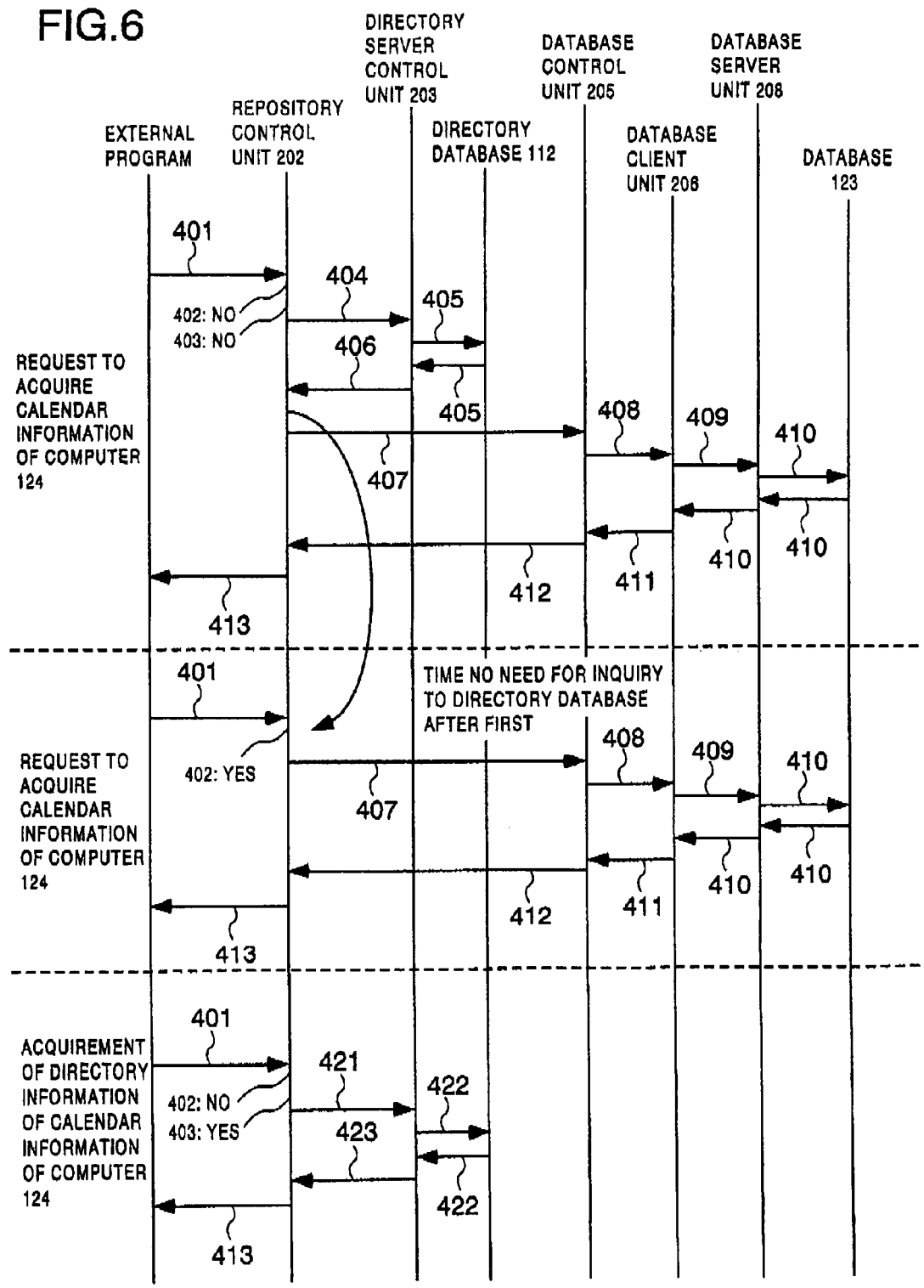

INTEGRATED DATABASE SYSTEM AND METHOD FOR ACCESSING A PLURALITY OF DATABASES

This application claims priority from Japanese Patent Application Reference No. 11-176412, filed on Jun. 23, 1999, the entire content of which is incorporated herein by reference for all purposes.

BACKGROUND OF THE INVENTION

The present invention relates to the technique of efficiently accessing plural databases on a network system.

There are some cases in which plural database servers are provided on a network system. The plural database servers provide users on the network with their stored objects, and each of the database servers manages its own stored objects independently of the other database servers.

Directory databases are known which provide users on a network system with information such as the addresses of individuals or organizations on the network system. One example of such directory databases is an LDAP server which is described in "LDAP: Programming Director-Enabled Applications with Lightweight Directory Access Protocol" (MacMillan Technology Series), written by Tim Howes and Mark Smith, published by Macmillan Technical Publishing, ISBN 1578700000.

In a case where plural independent databases are present on a network system, if a user is to access a particular object stored in a particular database server, the user needs to specify the particular database and the particular object.

Before accessing the object, the user must be burdened with looking into the database server in which the object is stored.

SUMMARY OF THE INVENTION

The present invention makes it easy to access a particular object stored in a particular database server in a case where plural independent databases are present on a network system.

The present invention provides, for example, an integrated database system which includes a plurality of database systems connected to one another through a network, each of the plurality of database systems managing its own stored data independently of the other database systems and accessing the stored data in accordance with an access request, and an integrated database unit connected to the network.

The integrated database unit includes:

a directory database which stores a correspondence between each of the data stored in the plurality of database systems and a database system in which each of the data is stored;

a database identifying means which identifies a database system stored in the directory database in accordance with target data of an access request issued by a user; and a data access means which accesses the target data of the access request issued by the user, by issuing the specified database system with a request to access the target data of the access request issued by the user.

According to the integrated database system, if the integrated database unit receives an access request from a user, the integrated database unit refers to a directory database and identifies a database system in which target data of the access request is stored, and issues an access request to the database system and accesses the target data of the access request issued by the user. Accordingly, if the user only issues an access request to the integrated database unit once, the user can access data. The user can access the data without being aware of which database system stores the data.

According to the present invention, in the integrated database system, for example, each of the database systems manages each data by using a local data name which is an identifier unique to each data in the database system itself, and accepts an access to data corresponding to a local data name, in accordance with an access request which specifies the local data name. The directory database stores, as to each of the data stored in the plurality of database systems, a correspondence with the database system in which each of the data is stored, a local data name of each of the data and a global data name which is an unique identifier for each data in all of the plurality of databases. The database identifying means receives an access request which specifies a global data name of target data of the access request from the user, and identifies a database system and a local data name which correspond to the received global data name and are stored in the directory database. The data access means issues the identified database system with an access request which specifies the identified local data name, and accesses the target data of the access request issued by the user.

As described above, according to the present invention, the integrated database unit manages the correspondences between global data names and local data names by means of a directory database, and receives a data access request from a user on the basis of a global data name and performs conversion between the global data name and a local data name, thereby accessing the database.

Accordingly, even if the same local data name occurs in each of a plurality of independent databases, the user can readily access the desired data that the user specifies on the basis of a global data name.

BRIEF DESCRIPTION OF THE DRAWINGS

The present invention will be more apparent from the following detailed description, when taken in conjunction With the accompanying drawings, in which:

FIG. 4 shows the functional configurations of server computers according to the preferred embodiment of the present invention;

FIG. 5 shows steps of a process to be performed by each of the server computers according to the preferred embodiment of the present invention; and FIG. 6 shows one example of a signal sequence between each part according to the preferred embodiment of the present invention.

DETAILED DESCRIPTION OF THE PREFERRED EMBODIMENTS

One preferred embodiment of the present invention will be described below.

Figure 1:
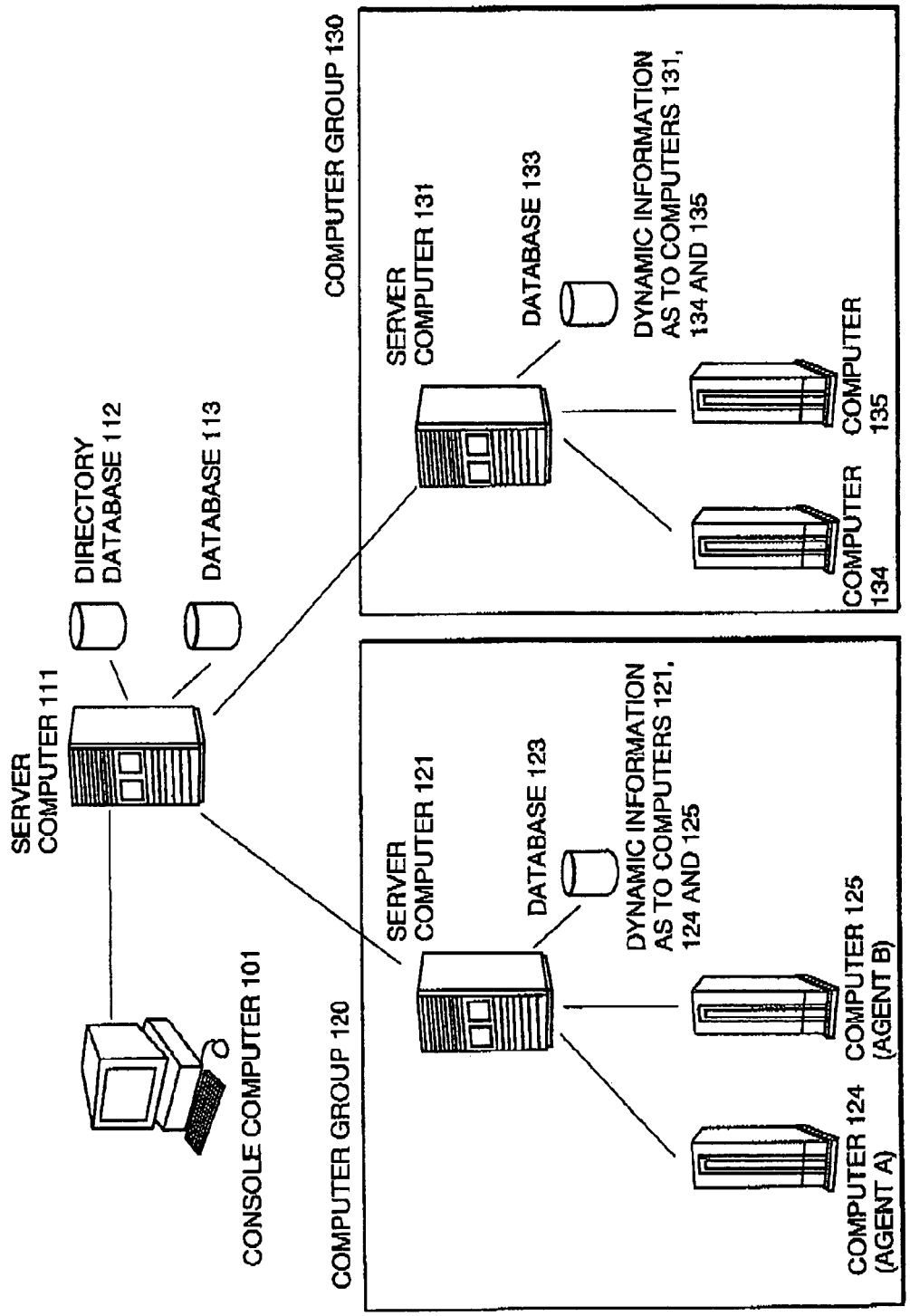
FIG. 1 shows a configuration of a network system according to a preferred embodiment of the present invention.

FIG. 1 shows the configuration of a network system according to the present embodiment.

Referring to FIG. 1, a console computer 101 is a computer through which an operator performs management of a system, such as monitoring of the operational status of the system. A server computer 111 is a computer for operating and monitoring the entire system, and includes a directory database 112 in which directory information is stored, and a database 113 in which information as to a server computer 111 and the like is stored as objects.

The server computer 121 includes a database 123 in which various kinds of information as to the server computer 121 itself as well as computers 124 and 125 are stored as objects, and the server computer 131 includes a database 133 in which various kinds of information as to the server computer 131 itself as well as computers 134 and 135 are stored as objects.

All of the computers are connected to one another by local area networks and communication lines.

Figure 2:
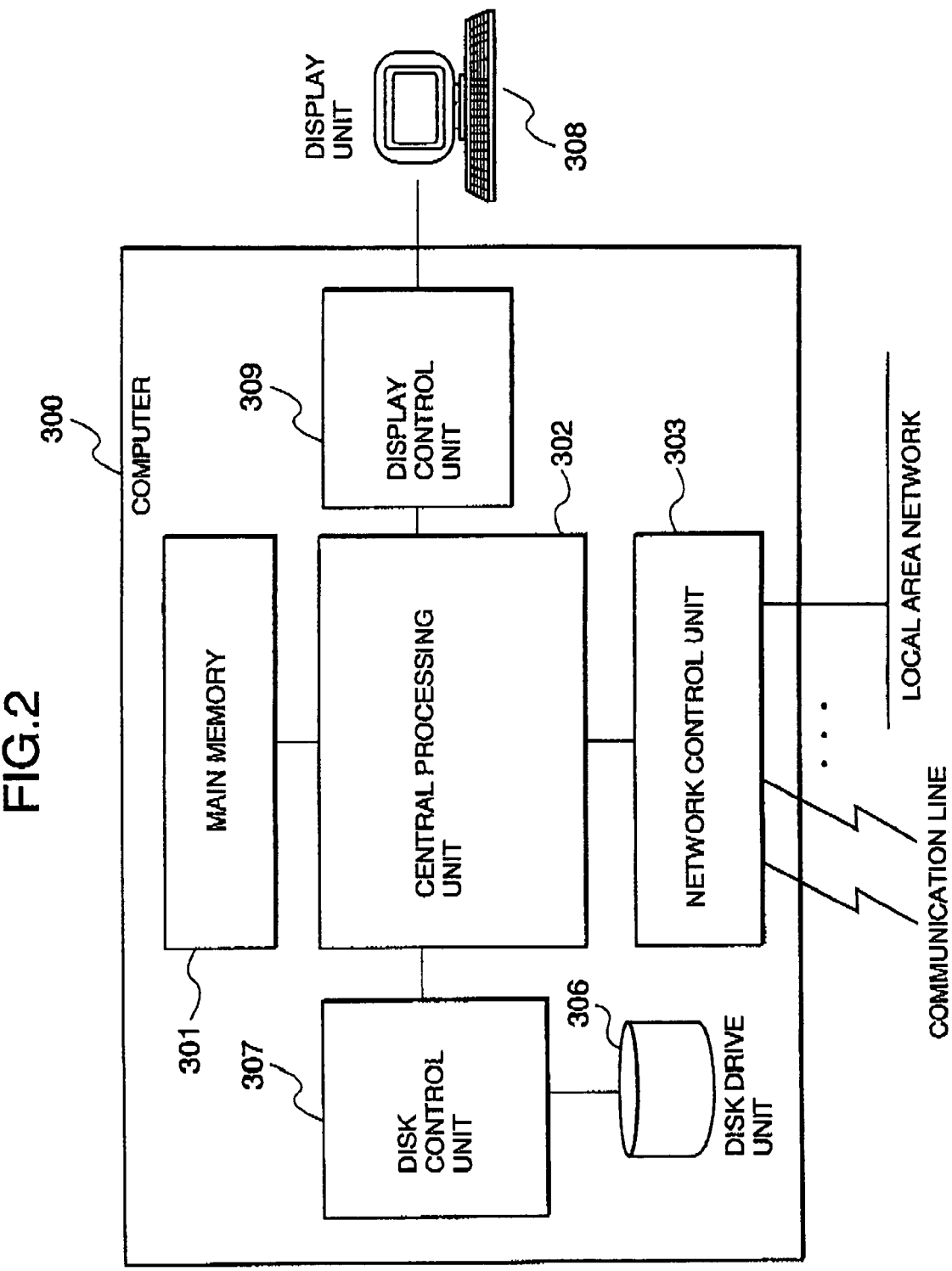
FIG. 2 shows one example of the hardware configuration of each computer according to the preferred embodiment of the present invention.

The hardware configuration of each of the computers may use a general hardware configuration of an electronic computer of the type which is shown in FIG. 2 by way of example.

The hardware configuration may be used including a central processing unit 302, a main memory 301, a network control unit 303 which controls the input and output of data to and from networks such as communication lines and a local area network, a disk unit 306, a disk control unit 307 which controls the input and output of the disk unit 306, a display unit 308, a display control unit 309 which controls the input and output of the display unit 308 and the like. The computers other than the console computer 101 need not necessarily include the display unit 308 and the display control unit 309.

The central processing unit 302 executes modules or codes which constitute a program loaded into the main memory 301 from the disk unit 306, whereby each of parts which will be described later with reference to FIG. 4 is formed on the computer as a process and each of operations which will be described later is carried out. The program may be of a type which is recorded on a recording medium such as a CD-ROM and is read by a driver (not shown) and stored in the disk unit 306, or of a type which is supplied through a network and stored in the disk unit 306.

Each of the databases 113, 123 and 133 is a repository database made of a relational database or other object-oriented database, and stores, as objects or various kinds of information as to the corresponding computers, system information as to the corresponding computers, the definitions of jobs, calendar information, the definitions of the operational schedules of jobs, the operational histories of jobs.

The directory database 112 has the directory of each of global object names which are given to the respective objects stored in each of the databases 113, 123 and 133, so that each of the global object names becomes unique in all of the databases 113, 123 and 133. The directory database 112 stores, as the information of the directory of each of the global object names, an identifier of a computer including a database in which an object having the corresponding global object name is stored, and a local object name which is a unique identifier given to identify the object on the database in which the object is stored.

Figure 3:
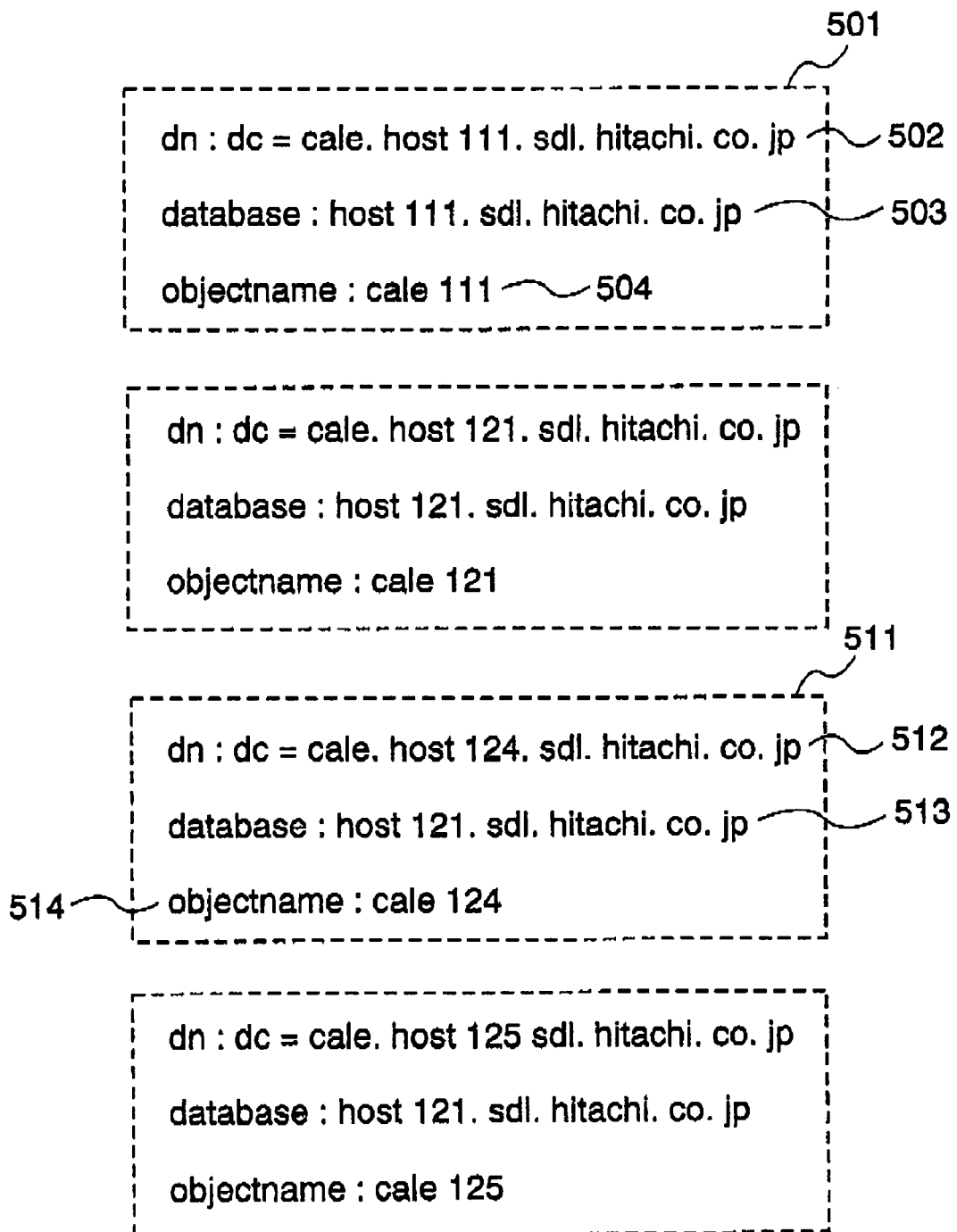
FIG. 3 shows directory information according to the preferred embodiment of the present invention.

FIG. 3 shows the information of directories stored in the directory database 112.

Referring to FIG. 3, reference numeral 501 denotes the information of a directory corresponding to an object which is the calendar information of the computer 111. The information 501 includes a global object name, as "DN" 502 being an identifier of the directory, which is given to the calendar information of the computer 111 so that the calendar information is made unique on the system; an identifier, as "database" 503, which is given to the computer 111 so that the computer 111 is made unique on the network system, the computer 111 having the database 113 which stores the object which is the calendar information of the computer 111; and an identifier, as "objectname" 504, which is the identifier of this object on the database 113.

Similarly, reference numeral 511 denotes the information of a directory corresponding to an object which is the calendar information of the computer 124. The information 511 includes a global object name, as "DN" 512 being an identifier of the directory, which is given to the calendar information of the computer 124 so that the calendar information is made unique on the system; an identifier, as "database" 513, which is given to the computer 124 so that the computer 124 is made unique on the network system, the computer 124 having the database 123 which stores the object which is the calendar information of the computer 124; and an identifier, as "objectname" 514, which is the identifier of this object on the database 124.

In the present embodiment, the domain name of such a computer is used as an identifier which is described in the database of the information of the directory and is given to the computer so that the computer is made unique on the computer network system. Each of the computers can access the others on the basis of their domain names by using a well-known domain name server. The method of describing such a domain name in the information of the directory may be an arbitrary method which enables identification of the domain name. For example', dc=hitachi, do=co, dc=jp may be set as a base directory, and dc=host111, sdl, do=hitachi, do=co, do=jp may be described as the domain name of the server computer 111.

As the global object name which is described as "DN" in the information of the directory, i.e., as a global object name given to an object which is a particular kind of information of a particular computer, the domain name of the particular computer to which an identifier indicative of the particular kind is added may be used. In this case as well, the method of describing the domain name may be an arbitrary method as far as it enables identification of the domain name.

FIG. 4 shows the internal functional configuration of each of the server computers 111, 121 and 131.

Since the internal functional configuration of each of the server computers 121 and 131 may be the same, FIG. 4 shows the internal functional configurations of the server computers 111 and 121 with the server computer 131 omitted.

As shown, the server computer 111 has a repository API (Application Program Interface) unit 201, a repository control unit 202, a directory database control unit 203, a database control unit 205, a database client unit 206, a remote access unit 207, and a database server unit 208.

The server computer 121 has a database server unit 210.

The operation of the system will be described below with reference to the steps of the process shown in FIG. 5 and the signal sequence between each of the parts in the process shown in FIG. 6.

If an operator specifies the global object name of an object which is the calendar information of the computer 124 and instructs to acquire the object to the console computer 101, the console computer 101 requests the server computer 111 to acquire the object with the global object name.

In the server computer 111, the repository control unit 202 receives this request from the console computer 101 through the repository API unit 201 (Step 401).

If the repository control unit 202 has previously acquired the directory information of the directory of the same global object name and has cached the information, the repository control unit 202 transfers the process to Step 407 (Step 402).

However, if the storage location of the object has not yet been known, the repository control unit 202 causes the process to proceed to Step 403.

If the repository control unit 202 can cope with the request by using the information of the directory database 112 (for example, the request is to make an inquiry about the directory information of the object), the repository control unit 202 transfers the process to Step 421 (Step 403). However, in Step 403, if the request is to acquire the object, the repository control unit 202 cannot cope with the request by using the information of the directory database 112, and causes the process to proceed to Step 404.

The repository control unit 202 inquires of the directory database control unit 203 as to the directory information of the object having the global object name which the repository control unit 202 has been requested to acquire (Step 404).

The directory database control unit 203 inquires of the directory database 112 as to the directory information of the global object name, and the directory database 112 returns directory information corresponding to the inquired global object name to the directory database control unit 203 (Step 405). This directory information includes, in accordance with the directory information shown in FIG. 3, the domain name (described as "database" in FIG. 3) of the server computer 121 having the database 123 on which the object of the specified global object name is present, and the object name (described as "objectname" in FIG. 3) on the database 123.

When receiving the information, the directory database control unit 203 returns this information to the repository control unit 202 (Step 406).

The repository control unit 202 to which the information has been returned caches this information in its internal cache, and issues the database control unit 205 with the information returned from the directory database control unit 203 and a request to acquire the object (Step 407).

The database control unit 205 determines whether the "DN" of the computer issued together with the request to acquire the object is the domain name of the server computer 111, and issues the database client unit 206 with the information issued together with the acquirement request and a request to acquire the object (Step 408).

The database client unit 206 specifies the object name issued together with the request to acquire the object, and issues a request to acquire the object to the database server unit of a computer having the computer's domain name issued together with the request to acquire the object. At this time, the database client unit 206 accesses a different computer by using the remote access unit 207 (Step 409).

In this case, since the computer 121 is a different computer as viewed from the computer 111, the database client unit 206 issues the request to acquire the object to the database server unit 210 included in the server computer 121.

The database server unit 210 accesses the database 123 and acquires the object corresponding to the object name issued together with the request to acquire the object, and returns the object to the database client unit 206 of the computer 111 which has issued the request to acquire the object (Step 410).

If the database server unit 208 of the computer 111 receives a request to acquire an object, from the database client unit 206 of the same computer 111, the database server unit 208 similarly accesses the database 113 and acquires the object having the object name issued together with the request to acquire the object, and returns the object to the database client unit 206 of the computer 111 which has issued the request to acquire the object.

The database client unit 206 to which the object has been returned from the database server unit 208 returns the object to the database control unit 205 (Step 411).

The database control unit 205 returns the object to the repository control unit 202 (Step 412). The repository control unit 202 returns the object to the repository API unit 201 (Step 413).

The repository API unit 201 returns the object to the console computer 101, and the console computer 101 presents the acquired object to the operator.

If the operator is to acquire the calendar information of the computer 124 again after the above-described process, since the directory information of the object corresponding to the calendar information of the computer 124 has been cached in the previous process, the decision condition at Step 402 is YES. Accordingly, the repository control unit 202 omits Steps 403, 404, 405 and 406 and transfers the process to Step 407. Owing to this procedure, since it becomes unnecessary to access a directory database every time, it is possible to improve the overall processing speed.

In the above-described process, if the operator merely desires to know the directory information of an object corresponding to the information of the computer 124, the process transfers to Step 421 according to a conditional branch in Step 403. In Step 421, the repository control unit 202 instructs the directory database control unit 203 to check the information of the directory. Then, the directory database control unit 203 acquires the information of the directory from the directory database 112 (Step 422). Then, the directory database control unit 203 returns the acquired data to the repository control unit 202 (Step 423). The repository API unit 201 returns the information of the directory to the console computer 101, and the console computer 101 presents the acquired information of the directory to the operator.

In the above-described configuration, each of the database server units 208 and 210 of the respective computers 111 and 121 provides an object in accordance with not only a request to acquire an object, issued from the remote access unit 207, but also a request to acquire an object corresponding to a specified object name, issued from an arbitrary computer.

Owing to the above-described operation, the operator, if he or she only knows the global object name of an object, can access the object without knowing a database on which the object is present nor the object name on the database.

In the above-described embodiment, the server computer 111 includes the directory database 112, and performs acquirement of an object corresponding to a global object name specified by a user and transfer of the object to the user. In addition, each of the server computers 121 and 131 may include a directory database and a configuration similar to that of the server computer 111 so that each of the server computers performs acquirement of an object corresponding to a global object name specified by a user and transfer of the object to the user. In this case, a plurality of directory databases can be prepared by duplicating the contents stored in one directory database.

Although the above description of the embodiment has been made in connection with a case in which a user acquires an object by using a global object name, the present invention can be applied to various other accesses to objects, such as updating of an object by means of a global object name.

As is apparent from the foregoing description, according to the present invention, in a case where plural independent databases are present on a network system, it is possible to reduce the burden on users during access to a particular object stored in a particular database server.

While the present invention has been described in detail and pictorially in the accompanying drawings, it is not limited to such details since many changes and modifications recognizable to those of ordinary skill in the art may be made to the invention without departing from the spirit and the scope thereof.

What is claimed is:

1. An integrated database system, comprising:
a plurality of database systems connected to one another by a network, each of said plurality of database systems managing its own stored data independently of the other database systems and accessing the stored data in accordance with an access request; and
an integrated database unit connected to the network, wherein:
said integrated database unit includes:
a directory database which stores, as to each object stored in said plurality of database systems, corresponding information including directory information and a database system in which the object concerned is stored;
a directory control unit which acquires, by using said directory database, directory information corresponding to a target object of an accepted access request;
a database identifying unit which identifies, by using said directory database, the database system corresponding to said target object of the accepted access request; and
a database control unit which issues, on the basis of the acquired directory information, an access request to the database system having the target object of the accepted access request, wherein:
the database system includes a database server unit which accesses a database in accordance with the access request issued by said integrated database unit.

2. An integrated database system according to claim 1, wherein:
said directory database stores corresponding information between each of the objects stored in any one of said plurality of database systems and a database system in which each of the objects are stored, a local data name of each of the objects, and a global object name which is a unique identifier in all of said plurality of database systems;
said directory control unit receives an access request which specifies a global object name of a target object of the access request, and identifies a database system and a local object name corresponding to the received global object name; and
said database control unit issues the identified database system with an access request which specifies the identified local object name, and accesses the target object of the access request.

3. An integrated database system according to claim 2, wherein:
a database server unit in each of said plurality of database systems manages an object by using local object names which are unique identifiers in the database system in which said database server unit is included, and receives from said integrated database unit a request to access the object managed by the database server unit, in accordance with a specified local object name.

4. An integrated database system according to claim 1, wherein said integrated database unit serves as at least one of said plurality of database systems.

5. An integrated database unit which integrates a plurality of database systems connected to one another by a network, each of said plurality of database systems managing its own stored data independently of the other database systems and accessing the stored data in accordance with an access request, said integrated database unit being connected to the network, comprising:
a directory database which stores, as to each of the objects stored in said plurality of database systems, corresponding information including directory information of the object and a database system in which the object concerned is stored;
a directory control unit which acquires, by using said directory database, directory information corresponding to a target object of the accepted access request;
a database identifying unit which identifies, by using said directory database, the database system corresponding to said target object of the accepted access request; and
a database control unit which issues, on the basis of the acquired directory information, an access request to the database system having the target object of the accepted access request.

6. An integrated database unit according to claim 5, wherein:
said directory database stores correspondences between each of the objects stored in the plural database systems and the database system in which each of the objects is stored, a local object name of each of the objects, and a global object name which is an unique identifier in all of said plurality of database systems;
said directory control unit receives an access request which specifies a global object name of target object of the access request, and identifies a database system and a local object name corresponding to the received global object name; and
said database control unit issues the identified database system with an access request which specifies the identified local object name, and accesses the target object of the access request.

7. A database access method for an integrated database system which includes a plurality of database systems connected to one another by a network, each of said plurality of database systems managing its own stored data independently of the other database systems and accessing the stored data in accordance with an access request, said database access method which accesses the data stored in said plurality of database systems, comprising the steps of:
storing in a directory database of an integrated database unit which is connected to the network, information as to each of the objects stored in said plurality of database systems, corresponding information including directory information of the object and a database system in which the object concerned is stored,
acquiring, by using the directory database, directory information corresponding to a target object of an accepted access request;
identifying, by using the directory database, the database system corresponding to said target object of an accepted access request;
issuing, on the basis of the acquired directory information, an access request to the database system having the target object of the accepted access request; and
accessing a database in the database system in accordance with the access request issued by said integrated database unit.

8. A database access method according to claim 7, further comprising the steps of:
storing in said directory database of said integrated database unit correspondences between each of the objects stored in the plural database systems and the database system in which each of the objects is stored, a local object name of each of the objects, and a global object name which is an unique identifier in all of said plurality of database systems, receiving an access request which specifies a global object name of a target objects of the access request;

identifying a database system and a local object name corresponding to the received global object name; and issuing the identified database system with an access request which specifies the identified local object name, and accessing said target object of the access request.

9. A database access method according to claim 8, wherein each of the database systems receives from said integrated database unit a request to access objects managed by a database server unit, in accordance with a specified one of local object names which are managed by and are unique identifiers in the database system in which said database server unit is included.

10. A program product which causes a computer to execute access to data stored in a plurality of database systems, the computer comprising: a plurality of database systems connected to one another through a network, each of the plurality of database systems managing its own stored data independently of the other database systems and accessing the stored data in accordance with an access request; and an integrated database unit connected to the network, wherein:

said program product further comprising:

a code which causes an integrated database unit connected to the network and including a directory database to acquire, by using said directory database, directory information corresponding to target objects of an accepted access request, said directory database storing, as to each of the objects stored in said plurality of database systems, corresponding information including the directory information of the object and a database system in which the object concerned is stored;

a code which causes said integrated database unit to identify, by using said directory database, a database system corresponding to a target object of an accepted access request;

a code which causes said integrated database unit to issue, on the basis of the acquired directory information, an access request to said database system having said target object of the accepted access request; and a code which causes said database system to access a database in accordance with the access request issued by said integrated database unit.

11. A program product according to claim 10, further comprising:

a code which causes said integrated database unit to store, in said directory database, correspondences between each of the objects stored in said plurality of database systems and the database system in which each of the objects is stored, a local object name of each of the objects, and a global object name which is an unique identifier in all of said plurality of database systems, a code which causes said integrated database unit to receive an access request which specifies a global object name of a target object of the access request;

a code which causes said integrated database unit to identify a database system and a local object name corresponding to the received global object name; and a code which causes said integrated database unit to issue the identified database system with an access request which specifies the identified local object name, and accessing said target object of the access request.

12. A program product according to claim 11, further comprising:

a code which causes each of said plurality of database systems to receive from said integrated database unit a request to access objects managed by a database server unit, in accordance with a specified one of local object names which are managed by and are unique identifiers in the database system in which the database server unit is included.

13. A program product according to claim 10, wherein the computer which constitutes said database systems and said integrated database unit has a readable storage medium in which said codes are held.

14. A program product according to claim 10, wherein said codes are stored through the network into the computer which constitutes said database systems and said integrated database unit.

15. A storage medium which stores a program which causes a computer to execute access to data stored in a plurality of database systems, said computer constituting: said plurality of database systems connected to one another through a network, each of said plurality of database systems managing its own stored data independently of the other database systems and accessing the stored data in accordance with an access request; and an integrated database unit connected to the network, wherein:

said program further comprising:

a code which causes an integrated database unit connected to the network and including a directory database to acquire, by using the directory database, directory information corresponding to a target object of an accepted access request, said directory database storing, as to each of the objects stored in said plurality of database systems, a correspondence with the directory information of the object and a database system in which the object concerned is stored;

a code which causes said integrated database unit to identify, by using said directory database, a database system corresponding to a target object of an accepted access request;

a code which causes said integrated database unit to issue, on the basis of the acquired directory information, an access request to the database system having said target object of the accepted access request; and a code which causes the database system to access a database in accordance with the access request issued by said integrated database unit.

* * * * *